(12) United States Patent
Berkey et al.

(10) Patent No.: US 6,798,962 B2
(45) Date of Patent: Sep. 28, 2004

(54) BROADBAND ACCESS OPTIMIZED FIBER AND METHOD OF MAKING

(75) Inventors: George E. Berkey, Pine City, NY (US); Yanming Liu, Lexington, MA (US); Walter F. Love, Corning, NY (US); Daiping Ma, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/085,798

(22) Filed: Feb. 26, 2002

(65) Prior Publication Data

US 2003/0161597 A1 Aug. 28, 2003

(Under 37 CFR 1.47)

(51) Int. Cl.[7] .................................................. G02B 6/18
(52) U.S. Cl. ...................................................... 385/124
(58) Field of Search .................................. 385/123–128, 385/141–145

(56) References Cited

U.S. PATENT DOCUMENTS 6,574,403 B1 * 6/2003 Golowich et al. .......... 385/123

| 2002/0003938 A1 | 1/2002 | Srikant | 385/124 |
| 2002/0006259 A1 | 1/2002 | Tirloni | 385/127 |
| 2002/0102082 A1 * | 8/2002 | Sarchi et al. | 385/123 |
| 2003/0063875 A1 | 4/2003 | Bickham et al. | 385/98 |

* cited by examiner

*Primary Examiner*—Akm Enayet Ullah
*Assistant Examiner*—Michelle R. Connelly-Cushwa
(74) *Attorney, Agent, or Firm*—Joseph M. Homa; William J. Chervenak

(57) ABSTRACT

The present invention provides an optical fiber, comprising a core having an alpha parameter in the range of approximately 2 to approximately 8, a maximum index percent difference between the core and a cladding in the range of approximately 0.3% to approximately 0.5% and a core diameter in the range of approximately 6.0 to approximately 16.0 μm and a cladding. The optical fiber has a bandwidth of at least approximately 0.6 GHz.km at 850 nm, and is configured for multimode operation at a wavelength less than 1300 nm and single mode operation at a wavelength of at least approximately 1300 nm. The fiber also has significantly reduced intermodal noise. The present invention also includes a method of designing such a fiber, a fiber optic system provided such a fiber and a method of operating a fiber optic system with such a fiber.

35 Claims, 14 Drawing Sheets

FIG. 4 COHERENCE DAMPING FOR VARIOUS SOURCE LINEWIDTHS

FIG. 5  SIMULATED SPECTRUM FOR OPTICAL FIBER LENGTH = 10 m

FIG. 6  SIMULATED SPECTRUM FOR OPTICAL FIBER LENGTH = 20 m

FIG. 7 SIMULATED SPECTRUM FOR OPTICAL FIBER LENGTH = 50 m

FIG. 9 SIMULATED SPECTRUM FOR OPTICAL FIBER LENGTH = 500 m

FIG. 10  SIMULATED SPECTRUM FOR OPTICAL FIBER LENGTH = 1000 m

FIG. 11  SIMULATED SPECTRUM FOR OPTICAL FIBER LENGTH = 2000 m

FIG. 12  SIMULATED SPECTRUM FOR OPTICAL FIBER LENGTH = 5000 m

BROADBAND ACCESS OPTIMIZED FIBER AND METHOD OF MAKING

FIELD OF THE INVENTION

The present invention is directed generally to optical fiber for telecommunications and more specifically to an optical fiber capable of multimode operation at wavelengths below 1300 nm and single mode operation at wavelengths above 1300 nm, the optical fiber having reduced intermodal noise.

BACKGROUND OF THE INVENTION

The optical fiber typically used to wire homes and small businesses has undesirably low bandwidth. Currently, 850 nm multimode fiber is the preferred fiber for wiring homes and small businesses because the various system components (e.g. lasers, receivers) used in conjunction with this fiber are inexpensive. However, conventional 850 nm multimode fiber can support a relatively low bit rate.

Typically, upgrading to a higher bandwidth system requires replacing the existing fiber. Conventional 850 nm multimode fiber is incompatible with higher bit rate components, such as 1300 nm single mode lasers and receivers. Therefore, it is not possible to upgrade a conventional 850 nm multimode system to a higher bit rate system without replacing all of the components, especially the fiber. Typically, to upgrade a conventional 850 nm multimode system to a higher bit rate system, the conventional 850 nm multimode fiber is replaced with a 1300 nm single mode fiber such as Corning SMF28™.

Replacing the existing fiber can be expensive. For example, replacing the 850 nm multimode fiber often entails digging up the old fiber and laying the new fiber in its place. Additionally, fiber replacement often requires significant reconstruction of the home or office installation. Thus, fiber replacement is often a costly and time-consuming process.

Rather than replacing old fiber and laying new fiber, it would be preferable to initially install a fiber capable of multimode operation at 850 nm and single mode operation at 1300 nm. Thus, upgrading a system with such a fiber would only require replacing system components. Experimental fibers capable of both multimode operation at 850 nm and single mode operation at 1300 nm have been reported in the literature, however, those fibers were step indexed and tended to have very low bandwidth at 850 nm. Therefore, it would be advantageous to have a fiber capable of multimode operation at 850 nm with a large bandwidth and single mode operation at 1300 nm.

An additional problem associated with multimode fibers is intermodal noise. Intermodal noise is related to a variation of the optical intensity at a given optical fiber output location due to optical interference between modes of different phase. Many factors may act singly or in combination to produce phase changes that can cause intermodal noise. Example factors include, changes in temperature, mechanical distortions (including movement or vibration), as well as changes in optical source wavelength.

Intermodal noise is a common problem in multimode fibers used with highly coherent light sources, e.g., lasers. This is because the relative coherence of the modes allows the modes to effect the intensity of the light by interfering with each other. Less coherent sources, such as LED's, have a short coherence length and therefore are only subject to intermodal noise in very short lengths of fiber. However, LED sources are polychromatic which causes significant pulse broadening in the fiber. This is a problem because pulse broadening reduces bandwidth. Therefore, it would be advantageous to have a fiber designed for operation with coherent light sources which does not suffer from intermodal noise.

SUMMARY OF THE INVENTION

The present invention provides an optical fiber, comprising a core having an alpha profile with an alpha parameter in a range from approximately 2 to approximately 8, a maximum index percent difference between the core and a cladding in a range from approximately 0.3% to approximately 0.5% and a core diameter in a range from approximately 6.0 to approximately 16.0 μm and a cladding, wherein the optical fiber has a bandwidth of at least approximately 0.6 GHz.km at 850 nm, and is configured for multimode operation at a wavelength less than 1300 nm. Cut off wavelength of the optical fiber is in the range from about 1050 nm to 1300 nm so that single mode operation is exhibited at a wavelength of at least approximately 1300 nm.

In embodiments in accord with the invention the core diameter has a range of approximately 6.0 to 14.0 μm or a maximum index percent difference in the range of approximately 0.3% to 0.4%. A preferred range of alpha parameter is from approximately 2 to approximately 4.

In an embodiment of the optical fiber in accord with the invention effective area is greater than 70 μm² at 1550 nm and preferably greater than 90 μm². The pin array bend loss is less than 4 dB at 1550 nm and preferably less than 2 dB.

In yet another embodiment of the optical fiber in accord with the invention the mode field diameter is greater than or equal to 10 μm.

In a preferred embodiment of the invention, the optical fiber comprises a core and a cladding, wherein the optical fiber is a multimode fiber at an operating wavelength and is configured in accord with a given operating wavelength, the desired bandwidth, and the length of the fiber. In particular the peak bandwidth wavelength of the fiber is offset from the operating wavelength by an amount sufficient to reduce modal noise. The preferred amount of the offset depends upon fiber length, desired bandwidth, and operating wavelength.

In yet another preferred embodiment, the alpha parameter is approximately 2, the maximum index percent difference between core and clad has a range from approximately 0.35% to 0.40%, and the core diameter is in the range from approximately 14.0 to 16.0 μm. The embodiment provides an optical fiber having, at 1550 nm, an effective area greater than 90 μm² and a mode field diameter greater than 11 μm. Pin array bend loss is less than 2 dB at 1550 nm.

In an additional preferred embodiment, the alpha parameter is approximately 3, the maximum index percent difference between the core and the cladding is in the range of approximately 0.35% to approximately 0.4% and the core diameter is in the range of approximately 12.0 to approximately 15.0 μm, to provide a waveguide fiber having effective area greater than 85 μm², and mode field diameter greater than 10.5 μm. The pin array bend loss is less than 4 dB at 1550 nm.

In an additional preferred embodiment, the alpha parameter is approximately 4, the maximum index percent difference between the core and the cladding is in the range from approximately 0.3% to approximately 0.4% and the core diameter is in the range from approximately 12.0 to approximately 16.0 μm, to provide a waveguide fiber having, at 1550 nm, an effective area greater than 85 μm², and mode field diameter greater than 10.5 μm. The pin array bend loss at 1550 nm is less than 3.5 dB.

In an additional embodiment of the invention, the offset between peak bandwidth wavelength and operating wavelength is selected to provide respective group time delays for modes which are either all positive or all negative. The sign of the delay is determined with reference to the arrival time of the lowest order mode ($LP_{01}$ mode). A positive group time delay pertains to a mode which arrives before the $LP_{01}$ mode and a negative arrival time is the converse.

In another embodiment of the optical fiber in accord with the invention the absolute value of the sum of the respective group time delays is greater than 0.

A second aspect of the invention is a method of designing an optical fiber having a bandwidth of at least 0.6 GHz.km at 850 nm in multimode operation and being in single mode operation at a wavelength of at least approximately 1300 nm, comprising, determining for a given length of optical fiber a minimum difference between the operating wavelength and a peak bandwidth wavelength such that the difference in the optical path lengths of the modes in multimode operation is greater than at least one coherence length of the fiber, the coherence length being associated with a source utilized to launch light within the optical fiber at the operating wavelength, and determining an index profile associated with the optical fiber in accordance with the minimum difference.

In an embodiment of the method of the second aspect of the invention, determining the minimum difference in offset between peak bandwidth wavelength and operating wavelength includes the step of calculating a speckle constant gamma, γ. The speckle constant is calculated as a function of bandwidth, line width of the light source, intensity of the light source, and length of the optical fiber.

In another embodiment in accord with the method, the step of determining a minimum difference includes having the respective group delay times of the modes be all negative or all positive.

In another embodiment in accord with the method, the step of determining an index profile includes at least one of determining the operating wavelength, the desired bandwidth, or the length of the optical fiber during operation.

Another aspect of the optical fiber of the present invention includes an optical fiber system comprising an optical fiber with a core having an alpha profile with an alpha parameter from approximately 2 to approximately 8, a maximum index percent difference between the core and a cladding from approximately 0.3% to approximately 0.5% and a core diameter of approximately 6.0 to approximately 16.0 μm and a light source optically coupled to the optical fiber. The alpha parameter, the maximum percent index difference, and the core diameter are chosen to provide an offset between peak bandwidth wavelength and operating wavelength sufficient to reduce intermodal noise at the operating wavelength.

An additional aspect of the invention is a method of operating an optical fiber system comprising providing an optical fiber wherein the optical fiber is a multimode fiber at an operating wavelength and has a peak bandwidth wavelength offset from the operating wavelength and operating a light source at the operating wavelength.

BRIEF DESCRIPTION OF THE DRAWINGS

The foregoing and other features, aspects and advantages of the present invention will become apparent from the following description, appended claims and the exemplary embodiments shown in the drawings, which are briefly described below. It should be noted that unless otherwise specified like elements have the same reference numbers.

DETAILED DESCRIPTION OF THE PREFERRED EMBODIMENTS

Figure 1:
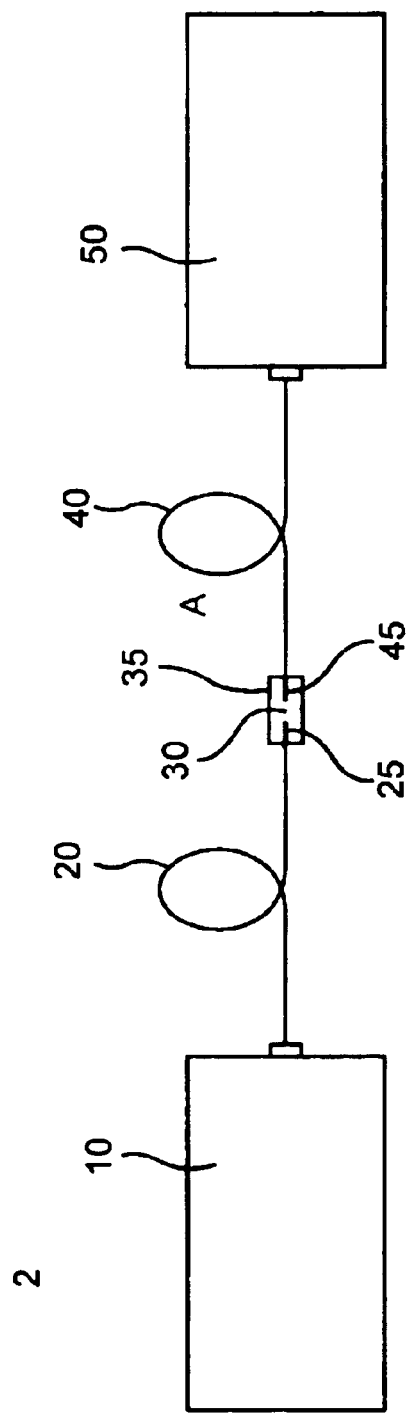
FIG. 1 is a schematic diagram of the experimental equipment.

The inventors have discovered that it is possible to design a fiber capable of multimode operation at 850 nm having high bandwidth and single mode operation at wavelengths of at least approximately 1300 nm. This can be accomplished by producing a fiber with an alpha profile having an alpha parameter of approximately 2–8, a maximum index percent difference between the core and a cladding of approximately 0.3%–0.5% and a core diameter of approximately 6.0–16.0 μm. In addition to being capable of both multimode and single mode operation, these fibers have higher effective areas and lower pin array bend loss than conventional single mode optical waveguide fiber such as SMF-28™, available from Corning, Inc.

The alpha profile is a graded-index profile which is described by the following power law equation, $$n(r)=n_0\sqrt{1-2\Delta(r/a)^\alpha}$$

where, $n_0$ is the maximum refractive index of the core of the optical fiber; $\Delta$ is the index difference between the indices of refraction of the core and cladding, $n_c$ of the optical fiber; a=radius of the core; r=radial position (0<r<a) measured from the center of the core toward the cladding; and α (alpha) is a parameter. The maximum relative index difference $\Delta$ may be exactly defined as, $$\Delta = \left[\frac{n_0^2 - n_c^2}{2n_0^2}\right].$$

It will be understood that the term index difference $\Delta$ and relative index difference $\Delta$ are used interchangeably herein. The $\Delta$ is also referenced in the art at relative refractive index. The maximum index difference $\Delta$ may be approximated as $$\Delta \approx \frac{n_0 - n_c}{n_o}.$$

Generally, the maximum index difference is multiplied by 100 and reported in percent. The approximation is accurate to within 1% of the exact value $\Delta$. For practical purposes the two equations may be used interchangeably.

In addition to the above ranges, the inventors have discovered that certain combinations of alpha parameter, maximum index percent difference, and core diameter are particularly beneficial. These include, but are not limited to, an alpha parameter of approximately 2, $\Delta$=0.35–0.4%, and a core diameter of 14.0–16.0 μm; an alpha parameter of approximately 3, $\Delta$=0.35–0.4%, and a core diameter of 12.0–15.0 μm ; and an alpha parameter of approximately 4, $\Delta$=0.30–0.4%, and a core diameter of 12.0–16.0 μm.

Properties of exemplary fibers designed in accordance with the present invention are listed in Table I along with properties of a standard SMF-28™ fiber, manufactured by Corning, Inc. In this table, pin array bend loss and effective area ($A_{eff}$) were determined at a wavelength of 1550 nm.

TABLE I

| α | $\Delta$ (%) | Core Diameter (μm) | Dispersion @ 1525 (ps/nm-km) | Dispersion @ 1575 (ps/nm-km) | Cutoff $\lambda_c$ (nm) | Cabled Cutoff (nm) | Pin array Bend loss (dB) | Aeff (μm²) |
|---|---|---|---|---|---|---|---|---|
| 2 | .35 | 16.0 | 18.03 | 21.15 | 1236.4 | 1150 | 1.989 | 108.5 |
| 2 | .40 | 14.7 | 17.58 | 20.70 | 1242.8 | 1145 | 0.638 | 94.6 |
| 3 | .35 | 14.0 | 18.05 | 21.13 | 1231.9 | 1131 | 1.299 | 101.6 |
| 3 | .40 | 13.0 | 17.68 | 20.74 | 1235.8 | 1125 | 0.365 | 88.4 |
| 4 | .30 | 14.5 | 18.59 | 21.68 | 1223.8 | 1145 | 3.192 | 117.7 |
| 4 | .35 | 13.4 | 18.32 | 21.38 | 1226.3 | 1144 | 0.830 | 100.7 |
| 4 | .40 | 12.5 | 18.02 | 21.07 | 1228.9 | 1142 | 0.203 | 87.8 |
| 20 | .35 | 9.0 | 15.61 | 18.49 | 1253.7 | 959 | 4.350 | 81.5 |
| SMF28 ™ | | | | | | | | |

To produce a fiber having high bandwidth at 850 nm in multimode operation and capable of single mode operation at 1300 nm, the fiber preferably has an alpha parameter in the range of approximately 2 to approximately 4. More preferably, the alpha parameter is in the range of approximately 2 to approximately 3.3. More preferably, the alpha parameter is in the range of approximately 2.5 to approximately 3.3. An alpha parameter that is too large or small can result in an unacceptable decrease in modal equalization (modal equalization occurs when all of the modes travel with the same velocity). Because bandwidth is a maximum at modal equalization, an increase in the difference in the modal velocities results in a decrease in bandwidth.

The maximum index difference $\Delta$ between the core and the cladding is preferably in the range of approximately 0.26% to approximately 0.5%. More preferably, the maximum index difference $\Delta$ is in the range of 0.3%–0.5%, and more preferably still in the range of 0.3% to 0.4%. A maximum index difference $\Delta$ that is too low results in an unacceptably high bend loss. A maximum index difference $\Delta$ that is too high can require an unacceptably small core diameter.

It is preferable that the diameter of the fiber core is in the range of approximately 6.0 to approximately 16.0 μm. More preferably, the core diameter is in the range of approximately 8.0 to approximately 14.0 μm. Even more preferably, the core diameter is approximately 12.0 μm. If the diameter of the core is too small, then it may become difficult to connect fiber segments because even small absolute misalignments of the fiber segments at the joint results in a large percentage misalignment of the fiber cores. If the core diameter is too large, then too many modes may propagate through the fiber, which may result in an increase in intermodal noise.

For each fiber the dispersion was measured at 1525 nm and 1575 nm and the dispersion slope calculated from these points. Using the dispersion slope, the dispersion curve was extrapolated to determine the zero dispersion wavelength $\lambda_0$ (the wavelength at which the dispersion goes to zero). Cut off wavelength of the fiber was measured. As can be seen from Table I, fibers made according to the invention have cut off wavelengths $\lambda_c$ between 1220 nm and 1250 nm. At the fiber cutoff wavelength $\lambda_c$, the fiber transitions from multimode to single mode. In actual applications, fibers generally are packaged in fiber optic cables. Cabling changes the cutoff wavelength. Generally, cabling lowers the cutoff wavelength between 50 nm to 400 nm, depending on the type of fiber. In the type of fibers disclosed in Table I, cabling lowers the cutoff wavelength between 50 nm and 100 nm. As shown in Table I, the cabled cutoff wavelengths of the fibers produced in accordance with the present invention are between 1125 nm and 1150 nm. Thus, all of those fibers are capable of multimode operation at 850 nm and single mode operation at 1300 nm in either uncabled or cabled configuration.

Attenuation induced in a fiber by bending can be measured as pin array bend loss. To determine pin array bend loss, attenuation is measured for a fiber configured to have essentially no induced bending loss. The fiber is then woven in a serpentine path through a pin array. The pin array is a set of ten cylindrical pins arranged in a single row and held in a fixed vertical position on a flat surface. The pin spacing is 5 mm, center to center, and the pin diameter is 0.67 mm. During testing, sufficient tension is applied to make the serpentine woven fiber conform to the portions of the pin surface at which there is contact between fiber and pin. Attenuation of the fiber in the pin array is then measured.

The pin array bend loss is the difference between the two measured attenuation values expressed in dB. All of the fibers shown in Table I that were designed in accordance with the present invention have lower pin array bend loss than the standard SMF-28™ fiber. In fact, the pin array bend losses are as low as 1/20 the pin array bend loss of the standard SMF-28™ fiber.

The effective area ($A_{eff}$) is generally defined as, $$A_{eff} = \frac{2\pi \left( \int_0^\infty |E|^2 r dr \right)^2}{\int_0^\infty |E|^4 r dr}$$

Where E is the electric field associated with the propagated light and r is the radial distance from the center axis of the fiber. A larger effective area is beneficial because it results in a lower power density across the fiber, improving fiber performance. The improved performance includes reduced nonlinear effects and lower splicing and connecting loss.

All of the fibers shown in Table I that were designed in accordance with the present invention have larger effective areas than the standard commercially available single mode fiber designed for use at a wavelength near 1300 nm, for example Corning's SMF-28™ fiber. For example, the first listed fiber has an effective area (Aeff) that is approximately 33% higher than the standard SMF-28™ fiber (108.5 $\mu m^2$ versus 81.5 $\mu m^2$).

In addition to the data in Table I, the bandwidths of these fibers were calculated via computer simulation. All of the fibers were found to have bandwidths of at least approximately 0.6 GHz.km at 850 nm in multimode operation, some having 850 nm bandwidth greater than 1.0 GHz.km.

Further, the inventors have discovered that intermodal noise can be reduced by designing a fiber having a $\lambda_p$ offset from the desired operating wavelength $\lambda_{op}$. In this configuration, the average difference between group time delays of the modes in multimode operation is sufficiently greater than zero to provide reduced intermodal noise. What constitutes a sufficient difference is discussed below.

The operating wavelength $\lambda_{op}$ is the wavelength at which the fiber is intended to be used. The peak bandwidth wavelength $\lambda_p$ is the wavelength at which equalization of the group time delays occur, i.e., the sum of the group time delay differences of all the modes propagating in a multimode fiber are nearly equal to zero. In the ideal case, the group time delay difference of the modes is zero at $\lambda_p$ which corresponds to a bandwidth which is large without bound. In practice, the bandwidth versus wavelength curve exhibits a large but finite value of bandwidth at wavelength $\lambda_p$. At equalization, the fiber has its highest bandwidth. However, there is a significant amount of intermodal noise when the operating wavelength $\lambda_p$ is at the peak bandwidth wavelength $\lambda_p$. Thus, operating at the peak wavelength results in a noisy signal while operating at any other wavelength results in a decrease in bandwidth. By designing a fiber with a sufficiently large difference between the operating wavelength and peak wavelength, $\lambda_{op}-\lambda_p$, the average difference between group time delays of the modes in multimode operation sufficiently greater than zero, to provide an optimum configuration in which bandwidth is as high as possible because intermodal noise has been limited. The bandwidth is effectively optimized by selecting refractive index profile parameters that move $\lambda_p$ away from $\lambda_{op}$. The reduction in bandwidth due to operating away from $\lambda_p$ is more than made up by the increase in bandwidth due to the reduction in intermodal noise.

Design parameters to overcome intermodal noise, that is the parameters to offset $\lambda_p$ from $\lambda_{op}$ by a desired amount, can be determined by calculation and then implemented in a fiber. The case for a 2-mode fiber is discussed below. Similar derivations have been developed for the general N-mode fiber as is discussed below.

In a 2-mode fiber, the optical phase difference between the lowest order modes, $LP_{11}$ and $LP_{01}$, can result in optical interference. As discussed previously, external perturbations, such as changes in temperature and mechanical distortions, can produce such phase differences which can result in optical interference and thus changes in the output optical intensity at a given transverse position on the output end of the fiber as a function of time. This modal interference condition, which varies in time, creates an intensity variation in the modal pattern, i.e., modal noise.

The external perturbations affect the group time delay, $\tau$. Equalization of the group time delay of the $LP_{11}$ and $LP_{01}$ waveguide modes occurs when $\Delta\tau=\tau(01)-\tau(11)=0$. In other words, the time it takes for both modes to travel the length of the fiber is the same. A fiber made in accord with the invention has an alpha parameter selected to nearly equalize mode group delay time. Sufficient difference in mode group time delay is maintained to limit intermodal noise. A number of factors, including index perturbations in the fiber, can modify the optimum alpha parameter for equalization. Thus, optimum alpha parameter is defined by a range. Fibers designed in accordance with this aspect of the invention have an alpha parameter in the range of approximately 2 to approximately 8. More preferably, alpha parameter is in the range of approximately 2 to approximately 4. More preferably still, alpha parameter is in the range of approximately 2 to 3.3 with a preferred narrower range 2.5 to 3.0.

Figure 13:
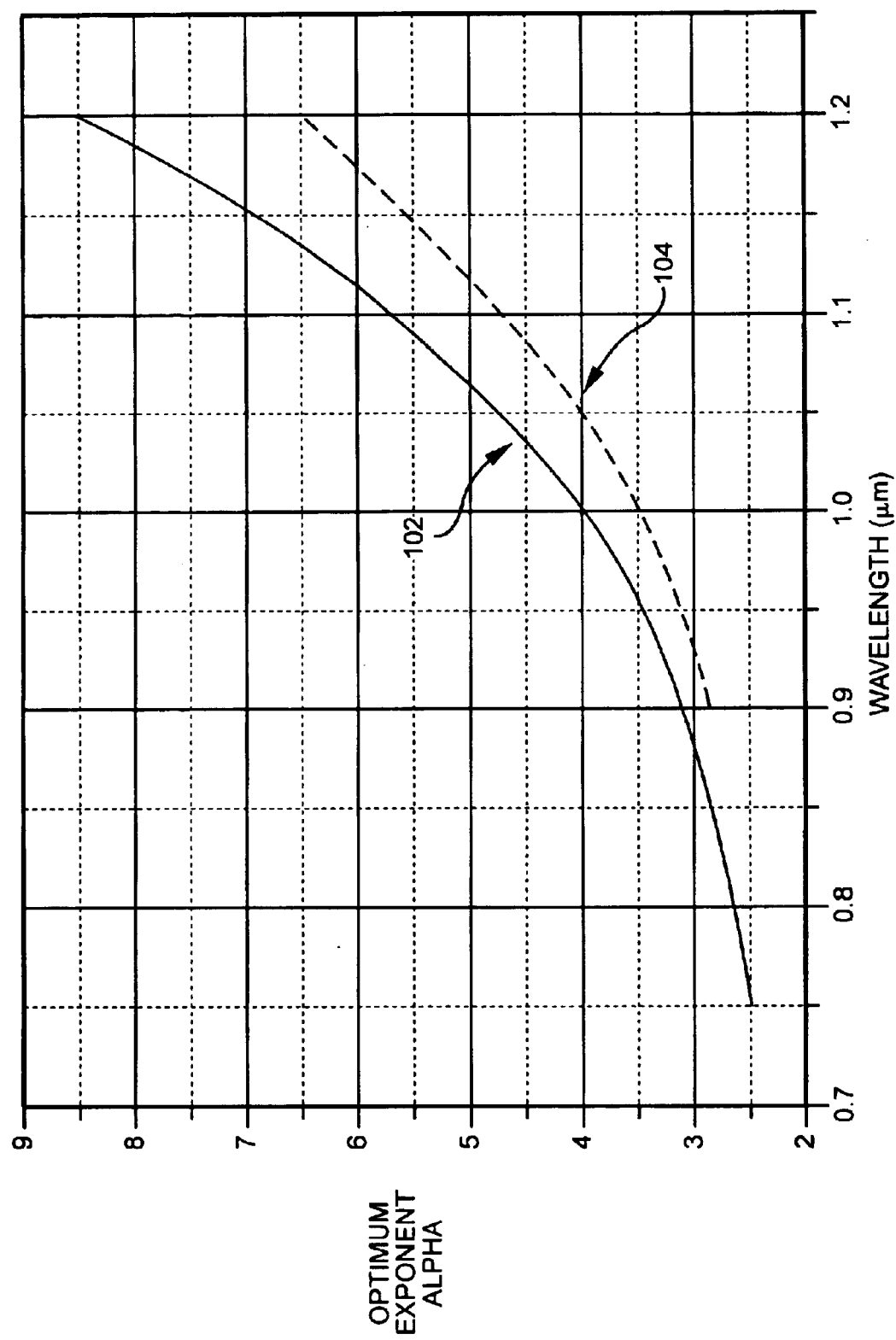
FIG. 13 is a chart of optimum values of the a profile parameter versus wavelength.
Figure 14:
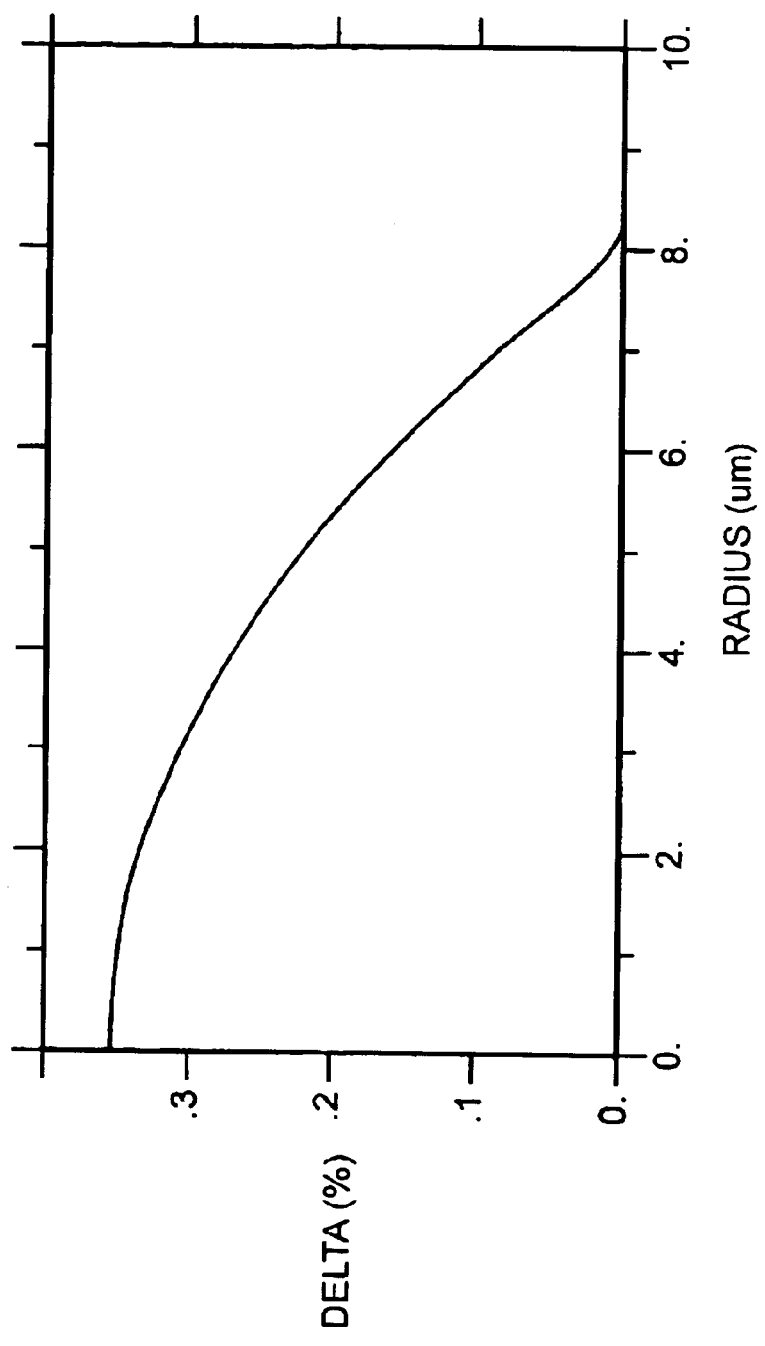
FIG. 14 is a chart of a refractive index profile in accord with the invention.

Referring to FIG. 13, an example is shown of the dependence of optimum α parameter on wavelength for the case of a 2-mode fiber. By optimum α parameter is meant the value of α of core refractive index profile that provides maximum bandwidth. Thus, an examination of curve 102 in FIG. 13 shows that for the values of Δ% and diameter of the core selected (see below), an α of 2.5 provides a $\lambda_p$ of 0.75 $\mu m$, a wavelength that can be desirable in a system having an operating wavelength $\lambda_p$ of 0.85 $\mu m$, for example. In the operating wavelength range from about 0.75 $\mu m$ to 1.0 $\mu m$, curve 102 shows corresponding optimum α values in the range from about 2.5 to 4. For a wavelength of about 850 nm, optimum alpha parameter is seen to be in the range 2.5 to 3.5. Curve 102 is representative of the core configuration in which Δ% is about 0.3% and core diameter is about 12 $\mu m$. For comparison purposes, curve 104 is included in FIG. 13. Curve 104 is representative of the same core configuration as that of curve 102 except that the refractive index profile exhibits a depression on the centerline of the fiber. The root mean square width of the depression is about 0.1 $\mu m$ and has a minimum relative refractive index percent of about zero. The presence of the centerline depression lowers the optimum alpha parameter, particularly at longer wavelengths.

The fiber in accord with the invention is designed so that $\Delta\tau$ is not 0 at the operating wavelength $\lambda_{op}$. In other words, the peak bandwidth wavelength $\lambda_p$ for time delay equalization is purposely offset in wavelength from the operating wavelength $\lambda_{op}$. The subsequent reduction in bandwidth is not severe, and allows a significant reduction in the intermodal noise. This reduction is due to coherence damping which depends on the source spectral width and the fiber propagation characteristics.

Both actual testing and mathematical simulations were conducted on various aspects of the invention. Actual testing was conducted using the apparatus 2 illustrated in FIG. 1.

The apparatus 2 includes a white light source 10, a 20 m long SMF fiber 20 (single mode at wavelength greater than about 1300 nm) having a joint region 25, a 2-mode fiber 40 fabricated according to the invention having a joint region 45 and an optical analyzer 50. Holding the joint regions 25 of the SMF fiber 20 and the joint region 45 of the 2-mode fiber 40 is an XYZ micro-positioner 35.

Figure 2A:
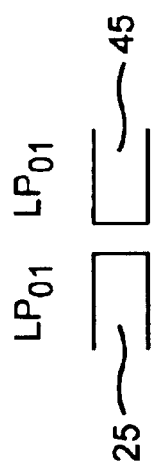
FIG. 2A is a detail view of the fiber joint in FIG. 1 illustrating aligned fibers.
Figure 2B:
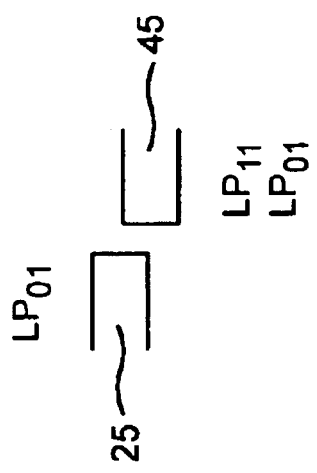
FIG. 2B is a detail view of the fiber joint in FIG. 1 illustrating offset fibers.

FIGS. 2A and 2B illustrate alternative fiber alignments used to test the 2-mode fiber fabricated according to the invention. With the micro-positioner 35, the joint regions 25 of the SMF fiber 20 and the joint region 45 of the 2-mode fiber 40 can be aligned as in FIG. 2A or offset as in FIG. 2B. If the fibers are aligned as in FIG. 2A, only the $LP_{01}$ mode is present in the 2-mode fiber 40. However, if the fibers are offset as in FIG. 2B, both the $LP_{01}$ and $LP_{11}$ modes are present in the SMF fiber 40.

Fiber designs and simulations were generated based on the following general equation for the speckle contrast, $\gamma$ (the standard deviation of the optical power fluctuations caused by optical interference among the modes of a multimode fiber), $$\gamma^2 = \frac{\sigma^2}{\langle I \rangle^2} = \frac{(\langle I^2 \rangle - \langle I \rangle^2)}{\langle I \rangle^2}$$

where $\sigma$ is the standard deviation for variations in optical intensity I and $\langle I \rangle$ is the average value of the optical intensity. For the two mode case, this equation simplifies to, $$\gamma^2 = \frac{A}{I_0^2} + \frac{B}{I_0^2}\cos(2\pi v_0 \Delta\tau)\exp[-(2\pi\sigma_s\Delta\tau)^2]$$

where A and B are adjustable parameters, $v_0$ is the optical frequency, $\sigma_s$ is a measure of the source spectral width, $I_0$ is the source intensity amplitude and $\Delta\tau$ is the normalized group delay time difference between modes (normalized per kilometer).

One can derive an expression for the speckle constant for the general N-mode case using the relation, $\gamma^2 = \int C_p(v) |\vec{h(v)}|^2 dv$, where $C_p(v)$ is the source spectral intensity and $\vec{h(v)}$ is the impulse response function. A satisfactory evaluation of the speckle constant can be made by making a Gaussian approximation for $C_p(v)$ and expanding $\vec{h(v)}$ in a Fourier series, both techniques being known in the art. The discussion of the two-mode case applies equally well to the N-mode case.

Under actual operating conditions, the second term of the two mode equation dominates. This term includes an oscillatory (cosine) term and, more importantly, an exponential decay term. The inventors have discovered that intermodal noise can be reduced as the magnitude of the argument of the exponential term increases. Preferably, the argument is at least approximately −1. More preferably, the argument is between approximately −1 and approximately −3. By increasing the argument in this manner, the intermodal noise can be significantly reduced. That is, the noise can be reduced to a level satisfactory for commercial use. In particular, the intermodal noise is made to be less than 0.5 dB. Preferably, the intermodal noise is made to be less than 0.25 dB.

For an N-mode fiber, $\Delta\tau$ is summed over all N modes. This calculation has been done to give an expression including the optimum alpha parameter in an equation including the group index $N_1$, fiber length L, speed of light c, relative index $\Delta$, and the number of modes corresponding to a particular alpha profile $N(\alpha)$. An operative equation for the N-mode case is, $$\left| \frac{N_1 L}{c} \left( \frac{\Delta(+/-\delta\alpha)}{\alpha_{op}+2} \right) \left( \frac{1}{N(\alpha_{op})} \right)^{\frac{\alpha_{op}}{\alpha_{op}+2}} \otimes 2\pi\sigma_s \right| \geq 1.$$

Given the index profile of the fiber and the operating wavelength, some of the group times delays may be positive while others may be negative relative to a reference time delay (the reference time delay is the travel time of light propagating at $\lambda_p$ over the particular length of fiber) the for propagation at the operating wavelength. Note, if all of the group delay differences are either all negative or all positive, the absolute value of the sum is always greater than zero, a preferred condition.

Figure 3:
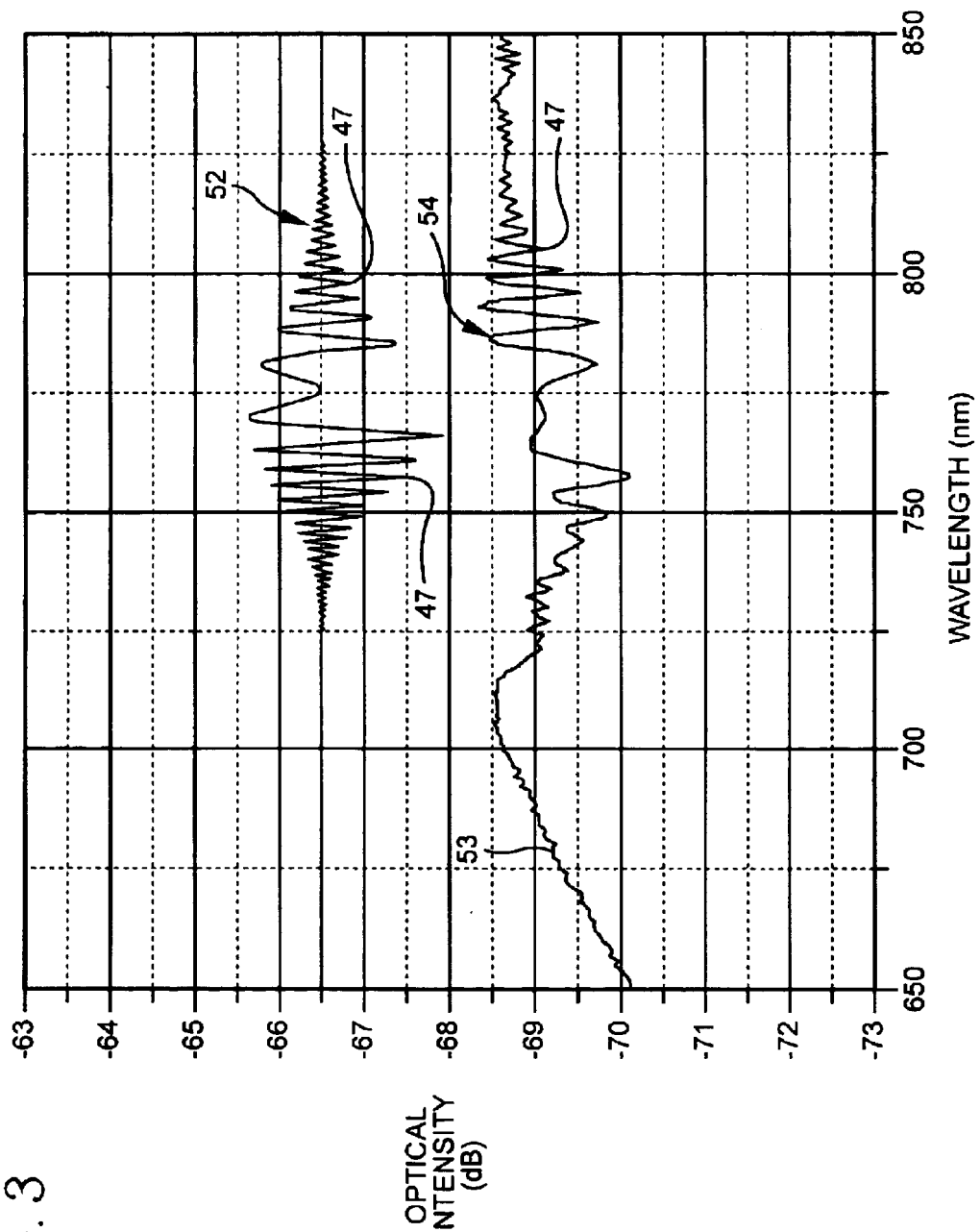
FIG. 3 is a plot comparing simulation data with actual data.

Two-mode fibers were designed and simulations conducted based on the two mode equation above. A comparison of the simulation, curve 52, with actual data, curve 54, is illustrated in FIG. 3. The actual data were collected from a fiber having a peak bandwidth wavelength $\lambda_p$ of approximately 770 nm and an operating wavelength $\lambda_{op}$ of 850 nm. The decreasing intensity portion of the curve, 53, is indicative of the cut off wavelength for the third mode, that is, the wavelength above which the fiber supports two modes. The 2-mode fiber length was approximately 5 meters and had a measured bandwidth of 1.3 GHz-km at 850 nm. In FIG. 3, the simulated data has been offset from the actual data for clarity. The simulation was done using a wavelength data point spacing of 0.5 nm, a $\lambda_p$ of 770 nm, and a full width half maximum (FWHM) spectral width of the source of 2 nm. As can be seen by comparing curves 52 and 54, the simulation is a very good match for the actual fiber data. Further, both the actual data and the simulation clearly illustrate that in a fiber fabricated according to this aspect of the invention, the intensity modulation with wavelength caused by aliased detection of the optical interference between modes is directly related to intermodal noise 47. This intermodal noise 47 is centered around the peak wavelength and decays dramatically at the operational wavelength, 850 nm.

Figure 4:
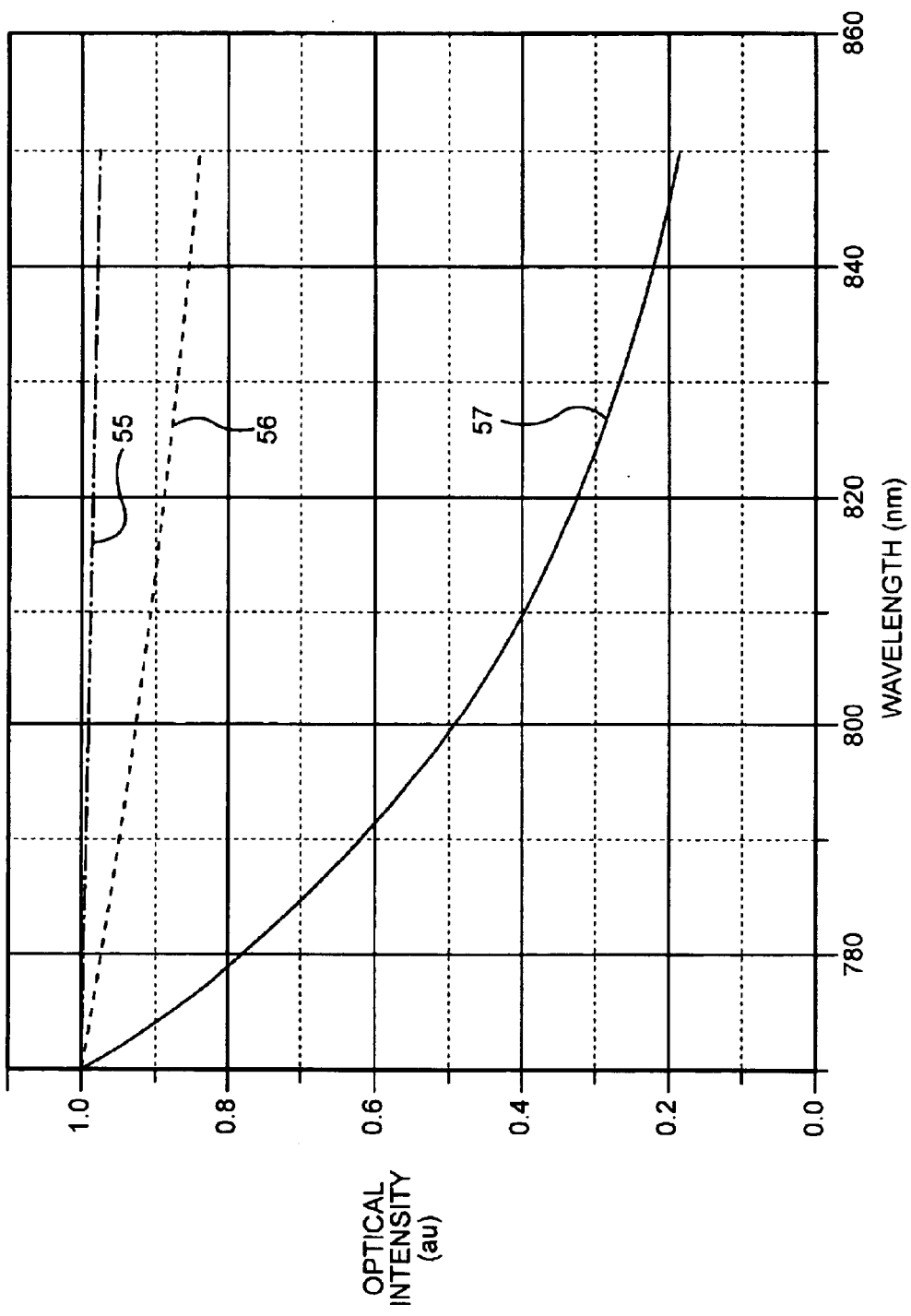
FIG. 4 is a plot illustrating the coherence damping for various source linewidths.
Figure 5:
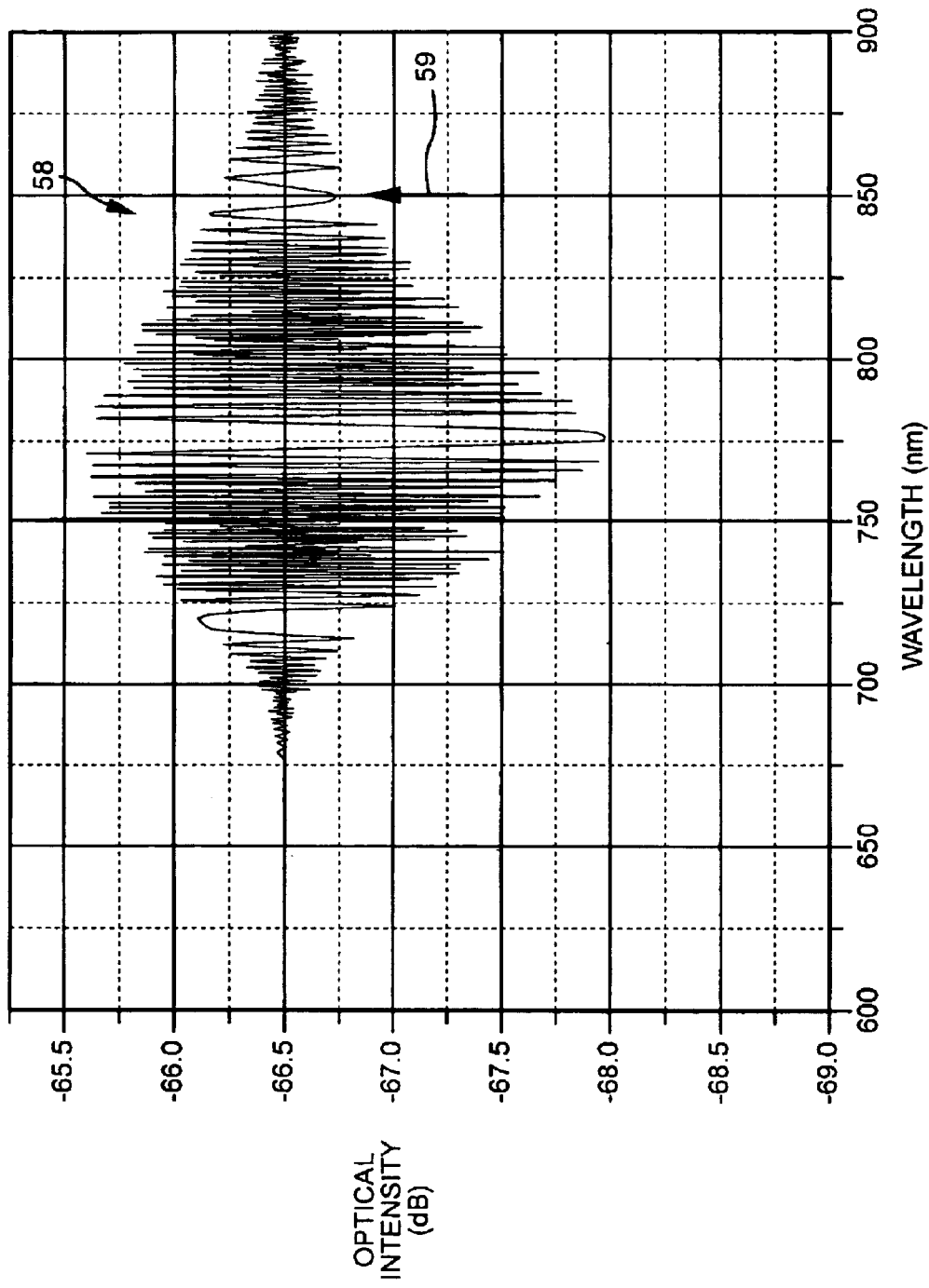
FIG. 5 is a simulated spectra for a fiber length of 10 meters.
Figure 6:
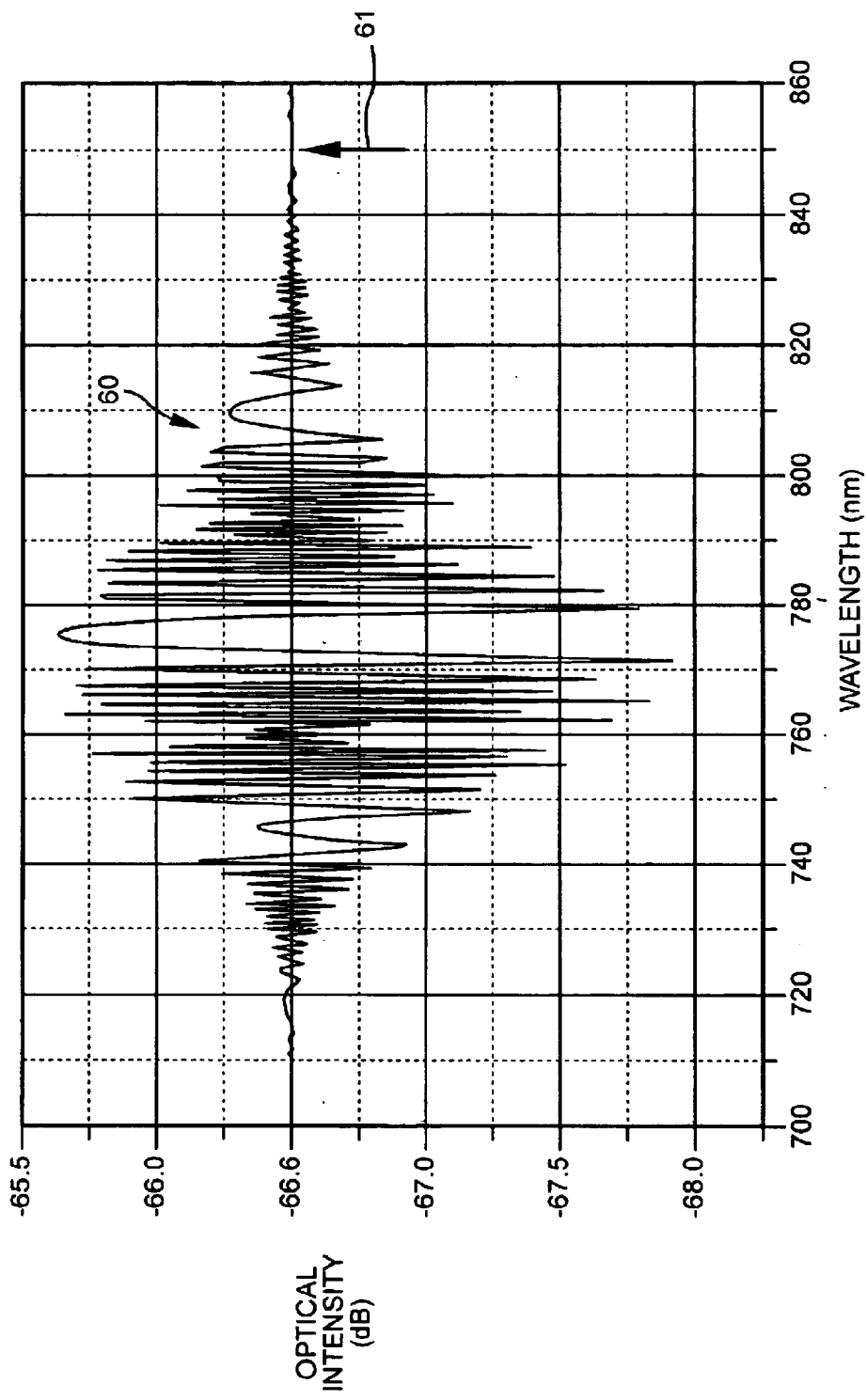
FIG. 6 is a simulated spectra for a fiber length of 20 meters.
Figure 7:
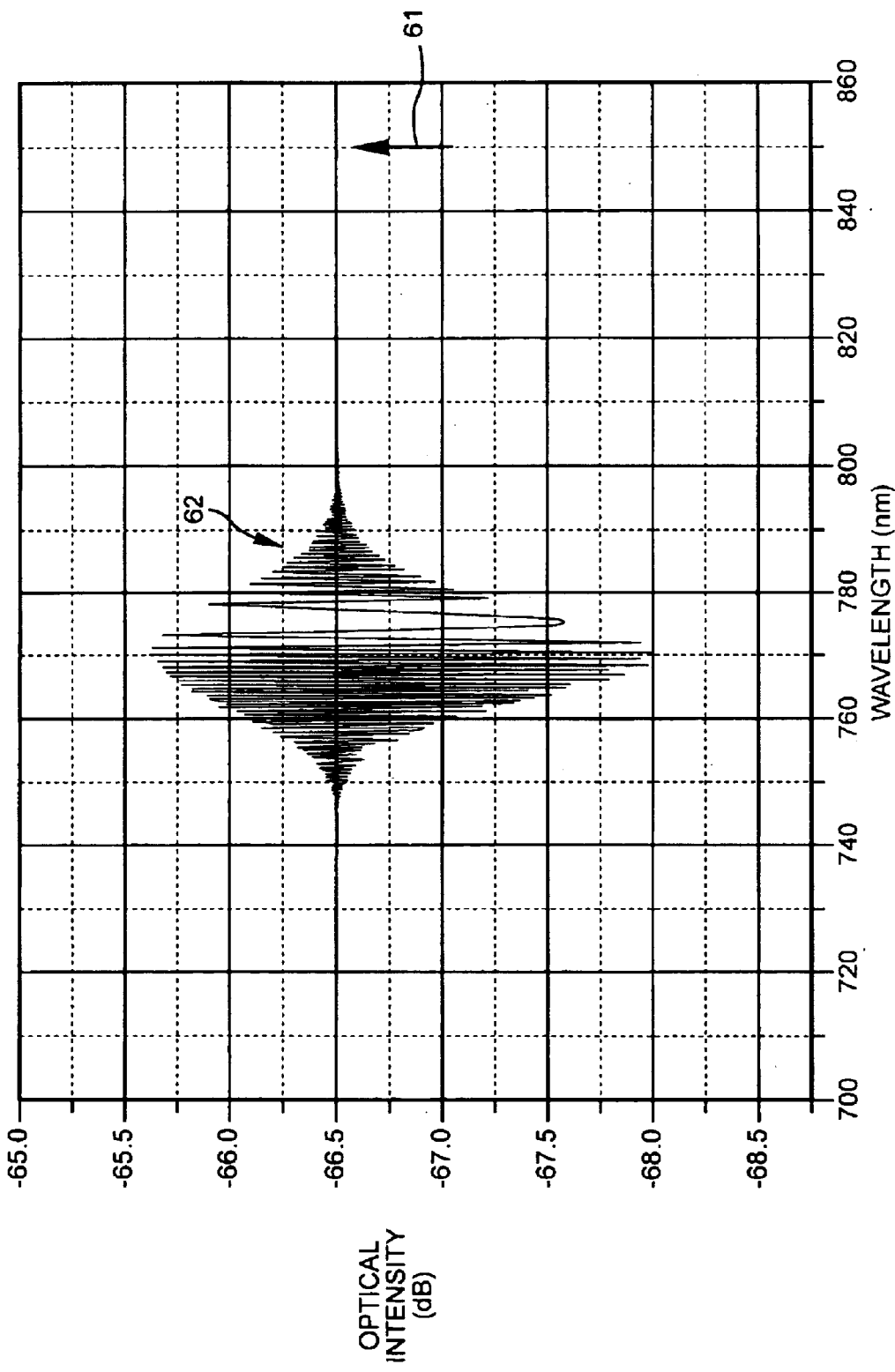
FIG. 7 is a simulated spectra for a fiber length of 50 meters.
Figure 8:
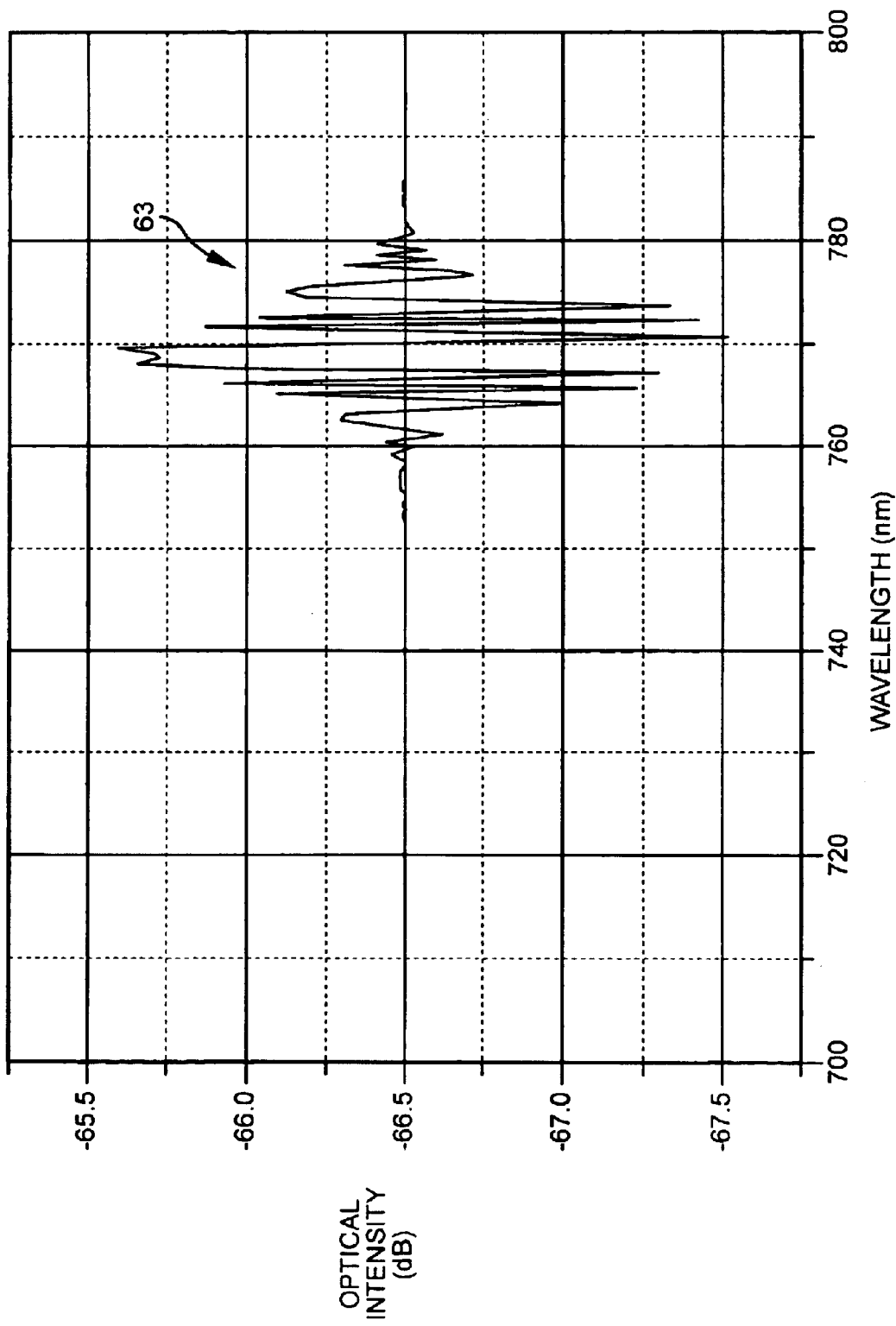
FIG. 8 is a simulated spectra for a fiber length of 100 meters.
Figure 9:
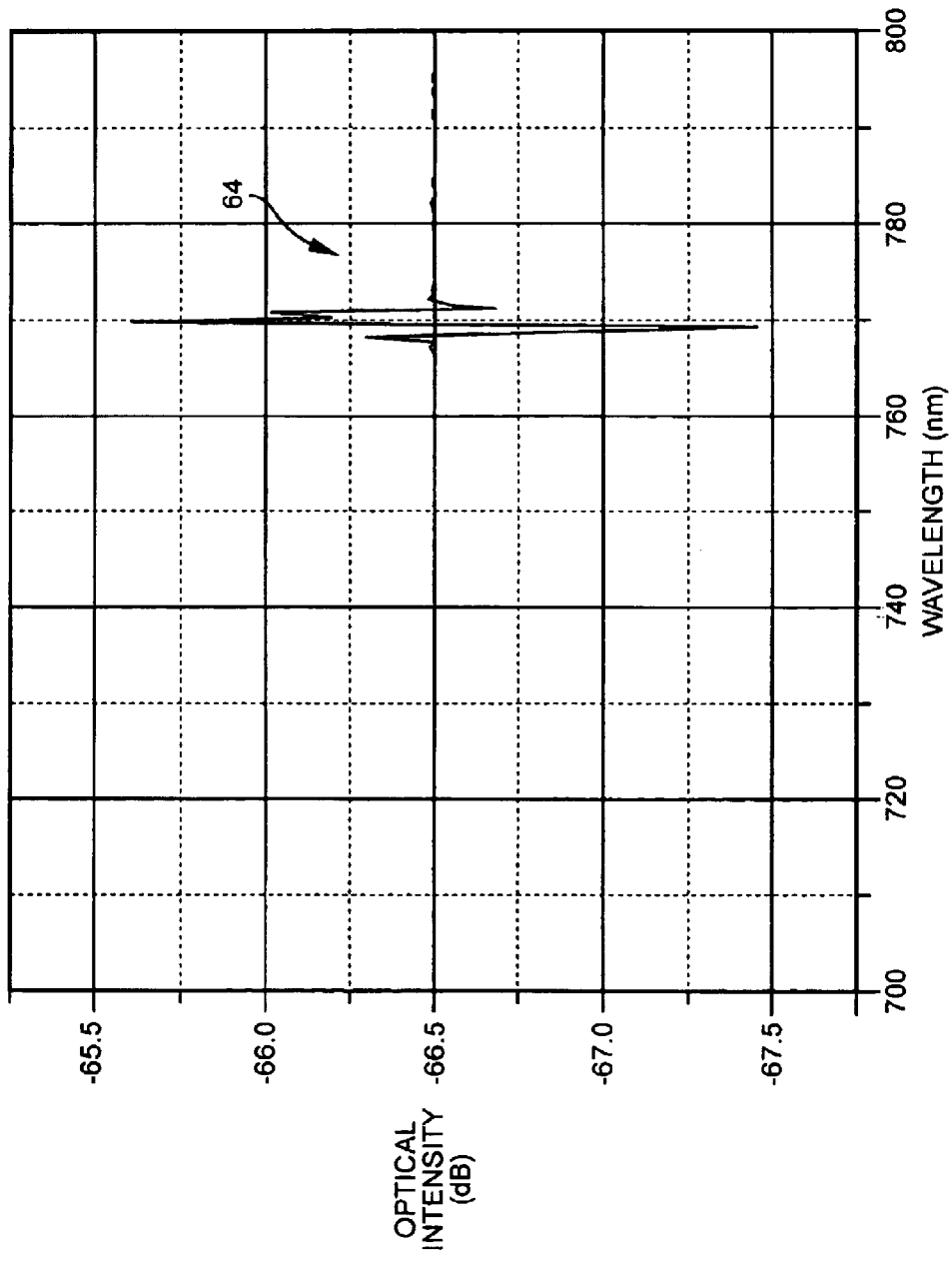
FIG. 9 is a simulated spectra for a fiber length of 500 meters.
Figure 10:
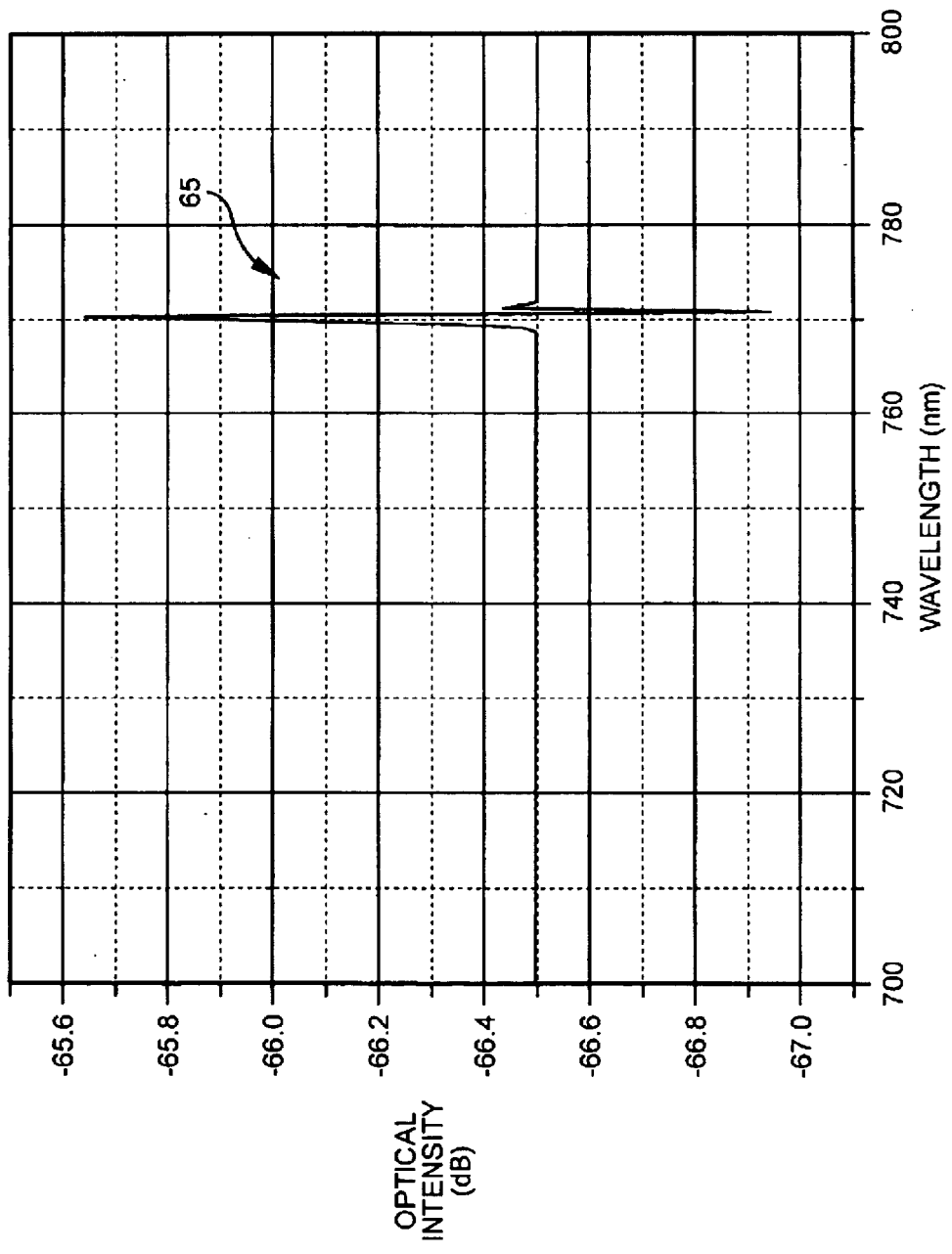
FIG. 10 is a simulated spectra for a fiber length of 1000 meters.
Figure 11:
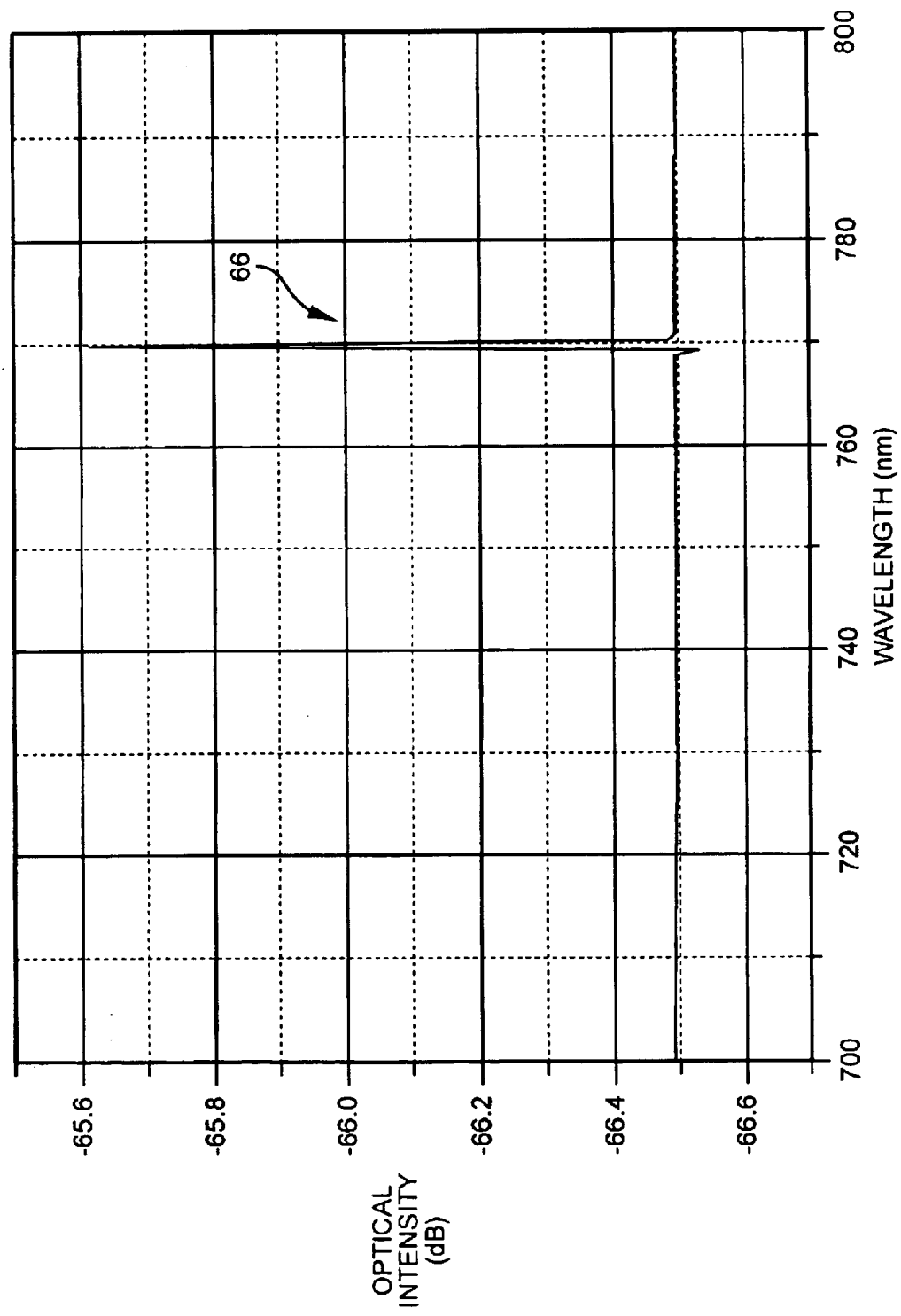
FIG. 11 is a simulated spectra for a fiber length of 2000 meters.

The decay of the spectral modulation or "coherence damping" is dependant on the linewidth of the light source. The more monochromatic the light, the more slowly the damping. Thus, a longer fiber length is required to ensure sufficient damping of intermodal noise at the end of the fiber. This is illustrated in FIG. 4. In this figure, simulated coherence damping curves for a 3 meter fiber length are compared. The damping curves 55, 56, and 57 were calculated using a wavelength data point spacing of 1.0 nm. The damping curve depends upon the FWHM source spectral width as can be seen by comparing curve 55 illustrative of damping for a 0.02 nm source spectral width, to curves 56 and 57, illustrative of damping for 0.2 nm and 2.0 nm spectral width, respectively. As can be seen in the figure, very coherent, narrow spectral width light sources display little damping in short lengths of fiber.

Figure 12:
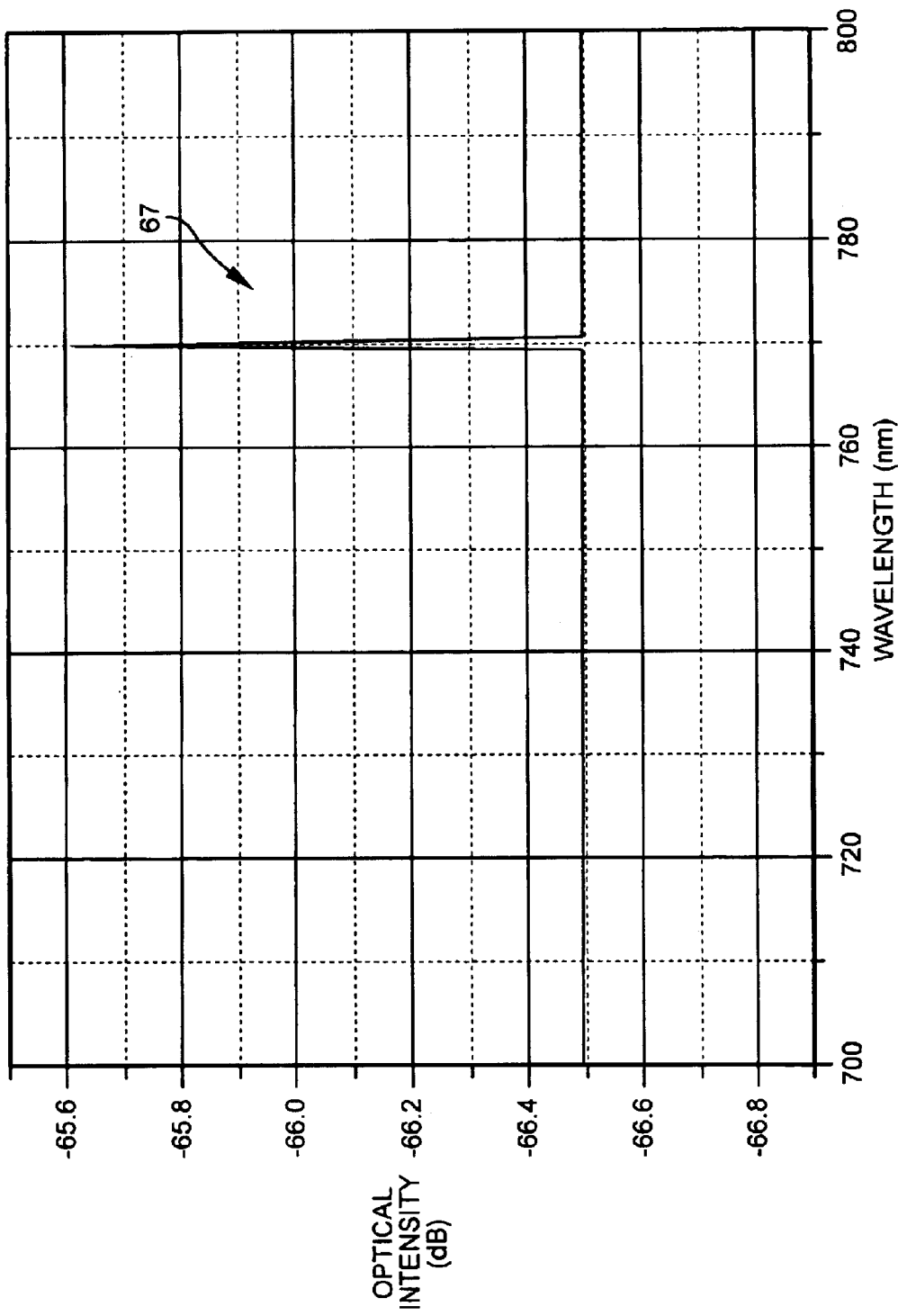
FIG. 12 is a simulated spectra for a fiber length of 5000 meters.

FIGS. 5–12 illustrate simulated spectra for fibers of lengths varying from 10 meters to 5 kilometers. All of these spectra were generated with a peak wavelength of 770 nm, a data point spacing of 0.5 nm, and a FWHM source with a spectral width of 0.40 nm. The longer the fiber, the more quickly the intermodal noise attenuates as a function of wavelength. Thus, for long lengths of fiber, it is possible to design and operate a fiber with a peak wavelength closer to the actual operating wavelength. In the figures, $\lambda_{op}$ is taken to be 850 nm. Curve 58 in FIG. 5, calculated for a 10 m fiber length shows modal noise level at the operation wavelength 59 to be about 0.5 dB. Bandwidth in this example is above about 0.6 GHz.km. Curve 60 in FIG. 6, calculated for a 20 m length of fiber shows modal noise near zero at operating wavelength 61. Bandwidth is greater than 0.6 GHz.km but less than 1.3 GHz.km. Likewise curve 62 in FIG. 7, calculated for fiber length of 50 m, shows modal noise of zero at operating wavelength 61. The same is true for curve 63 in FIG. 8 calculated for 100 m fiber length, curve 64 in FIG. 9 calculated for 500 m fiber length, curve 65 in FIG. 10, calculated for a 1000 m fiber length, curve 66 in FIG. 11 calculated for a 2000 m length, and curve 67 in FIG. 12 calculated for a 5000 m length . As fiber length increases, coherence damping increasing, thus narrowing the width of the intermodal noise. Curve 67 in FIG. 12 shows essentially no intermodal noise.

Further, the inventors have determined that longer fibers fabricated in accordance with the present invention allow the use of operating wavelengths $\lambda_{op}$ closer to the peak wavelength $\lambda_p$. Thus, with the use of longer fibers, one can achieve very high bandwidths with little intermodal noise. Combinations of fiber length and peak separation which the inventors have found to be particularly advantageous include, 10–20 m with the absolute value of the difference between $\lambda_{op}$ and $\lambda_p$ of approximately 80 to approximately 150 nm (bandwidth 0.6–1.2 GHz.km); 20–100 m with the absolute value of the difference between $\lambda_{op}$ and $\lambda_p$ of approximately 12 to approximately 80 nm (bandwidth 1.2–7 GHz.km); 100–1000 m with the absolute value of the difference between $\lambda_{op}$ and $\lambda_p$ of approximately 2 to approximately 12 nm (bandwidth 2–13 GHz.km); greater than 1000 m with the absolute value of the difference between $\lambda_{op}$ and $\lambda_p$ of approximately 0 to approximately 2 nm (bandwidth at least 3 GHz.km and preferably greater than 13 GHz.km). These results are summarized in Table II below for a fiber designed for operation at 850 nm as discussed above. The refractive index profile parameters can correspond to any of those set forth in Table 1.

TABLE II

| Fiber length (m) | $\lambda_{op} - \lambda_p$ (nm) | Bandwidth (GHz · km) |
| --- | --- | --- |
| 10–20 | 80–150 | 0.6–1.2 |
| 20–100 | 12–80 | 1.2–7 |
| 100–1000 | 2–12 | 7–13 |
| >1000 | 0–2 | >13 |

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. An optical fiber, comprising:
   a graded-index core and a cladding, said core including an alpha profile with an alpha parameter in the range of approximately 2 to approximately 8, a maximum relative index percent difference between the core and a cladding in the range of approximately 0.3% to approximately 0.5% and a core diameter in the range of approximately 6.0 to approximately 16.0 µm;
   wherein the optical fiber has a bandwidth of at least approximately 0.6 GHz.km at 850 nm and a cabled cut off wavelength in the range from about 1050 nm to 1300 nm.

2. The optical fiber of claim 1, wherein the core has a diameter in the range of approximately 6.0 to approximately 14.0 µm.

3. The optical fiber of claim 1, wherein a maximum index percent difference between the core and the cladding is in the range of approximately 0.3% to approximately 0.4%.

4. The optical fiber of claim 1, wherein the core has an alpha parameter in the range from approximately 2 to approximately 4.

5. The optical fiber of claim 1, wherein the effective area is greater than 70 µm² at 1550 nm.

6. The optical fiber of claim 1, wherein the effective area is greater than 90 µm² at 1550 nm.

7. The optical fiber of claim 1, wherein the pin array bend loss is less than 4 dB at 1550 nm.

8. The optical fiber of claim 1, wherein the pin array bend loss is less than 2 dB at 1550 nm.

9. The optical fiber of claim 1, wherein the mode field diameter is greater than or equal to 10 µm.

10. The optical fiber of claim 1, wherein an index profile of the core is configured in accordance with an operating wavelength, the bandwidth desired at the operating wavelength, and a length of the optical fiber.

11. The optical fiber of claim 10, wherein the index profile of the core is configured to have a peak bandwidth wavelength offset from the operating wavelength, the offset being sufficient to reduce intermodal noise.

12. The optical fiber of claim 1, wherein the alpha parameter is approximately 2, the maximum index percent difference between the core and the cladding is in the range from approximately 0.35% to approximately 0.4% and the core diameter is in the range from approximately 14.0 to approximately 16.0 µm, to provide a waveguide fiber having, at 1550 nm, effective area greater than 90 µm², and mode field diameter greater than 11 µm.

13. The optical fiber of claim 12, wherein pin array bend loss is less than 2 dB at 1550 nm.

14. The optical fiber of claim 1, wherein the alpha parameter is approximately 3, the maximum index percent difference between the core and the cladding is in the range of approximately 0.35% to approximately 0.4% and the core diameter is in the range of approximately 12.0 to approximately 15.0 µm, to provide a waveguide fiber having effective area greater than 85 µm², and mode field diameter greater than 10.5 µm.

15. The optical fiber of claim 14, wherein the pin array bend loss is less than 4 dB at 1550 nm.

16. The optical fiber of claim 1, wherein the alpha parameter is approximately 4, the maximum index percent difference between the core and the cladding is in the range from approximately 0.3% to approximately 0.4% and the core diameter is in the range from approximately 12.0 to approximately 16.0 µm, to provide a waveguide fiber having, at 1550 nm, an effective area greater than 85 µm², and mode field diameter greater than 10.5 µm.

17. The optical fiber of claim 16, wherein the pin array bend loss is less than 3.5 dB at 1550 nm.

18. An optical fiber system comprising:
   an optical fiber having a graded-index core and a cladding and a length, said core including an alpha profile with an alpha parameter in the range from approximately 2 to approximately 8, a maximum relative index percent difference between the core and the cladding in the range from approximately 0.3% to approximately 0.5% and a core diameter in the range from approximately 6.0 to approximately 16.0 µm;
   a light source optically coupled to said fiber and having an operating wavelength, said optical fiber being multi-mode at the operating wavelength;

wherein,
the alpha parameter, the maximum index percent difference, and the core diameter are selected to provide a peak bandwidth wavelength of said optical fiber that is offset from the operating wavelength by an amount sufficient to reduce intermodal noise at the operating wavelength.

19. The optical fiber of claim 18, wherein the length of the optical fiber is in the range of approximately 10 to approximately 20 m, an absolute value of the difference between the operating wavelength and the peak bandwidth wavelength is in the range of approximately 80 nm to approximately 150 nm, and the bandwidth is greater than approximately 0.6 GHz.km at the operating wavelength.

20. The optical fiber of claim 18, wherein the length of the optical fiber is in the range of approximately 20 m to approximately 100 m, an absolute value of the difference between the operating wavelength and the peak bandwidth wavelength is in the range of approximately 12 nm to approximately 80 nm, and the bandwidth is greater than approximately 1.2 GHz.km at the operating wavelength.

21. The optical fiber of claim 18, wherein the length of the optical fiber is in the range of approximately 100 to approximately 1000 m, an absolute value of the difference between the operating wavelength and the peak bandwidth wavelength is in the range of approximately 2 to approximately 12 nm, and the bandwidth is greater than approximately 2 GHz.km at the operating wavelength.

22. The optical fiber of claim 18, wherein the length of the optical fiber is greater than 1000 m, an absolute value of the difference between the operating wavelength and the peak bandwidth wavelength is greater than zero and less than approximately 2 nm, and the bandwidth is greater than approximately 3 GHz.km at the operating wavelength.

23. An optical fiber comprising:
a graded-index core and a cladding, the core having an alpha profile with an alpha parameter in the range of approximately 2 to approximately 8, a maximum relative index percent difference between the core and a cladding in the range of approximately 0.3% to approximately 0.5% and a core diameter in the range of approximately 6.0 to approximately 16.0 $\mu$m, wherein the effective area is greater than 70 $\mu m_2$ at 1550 nm.

24. An optical fiber comprising:
a graded-index core and a cladding, the core having an alpha profile with an alpha parameter in the range of approximately 2 to approximately 8, a maximum relative index percent difference between the core and a cladding in the range of approximately 0.3% to approximately 0.5% and a core diameter in the range of approximately 6.0 to approximately 16.0 $\mu$m, wherein the pin array bend loss is less than 4 dB at 1550 nm.

25. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, wherein at the operating wavelength each mode has a group time delay and all of the group time delays are all negative, each of the group time delays being referenced relative to a lowest order mode ($LP_{01}$ mode) associated with the optical fiber.

26. The optical fiber of claim 25, wherein at the operating wavelength each mode has a group time delay and the absolute value of the sum of the group time delay differences is greater than 0.

27. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, wherein the fiber is configured for multimode operation at a wavelength less than 1300 nm and single mode operation at a wavelength of at least approximately 1300 nm.

28. The optical fiber of claim 27, wherein a difference in a group time delay is at least one of all positive and all negative for all modes in the multimode operation of the optical fiber, each of the group time delay being referenced relative to a lowest order mode ($LP_{01}$ mode) associated with the optical fiber.

29. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, and
wherein the optical fiber is configured to have a bandwidth of at least approximately 0.6 GHz.km at 850 nm.

30. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, and
wherein the core has a diameter of in the range of approximately 6.0 to approximately 16.0 $\mu$m and a maximum index difference between the core and the cladding is in the range of approximately 0.3 to approximately 0.5%.

31. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, and
wherein the length of the optical fiber is in the range of approximately 10 to approximately 20 m, an absolute value of the difference between the operating wavelength and the peak bandwidth wavelength is in the range of approximately 80 nm to approximately 150 nm, and the bandwidth is 0.6 to 1.2 GHz.km at the operating wavelength.

32. An optical fiber, comprising:
a core; and
a cladding,
wherein the optical fiber is a multimode fiber at an operating wavelength and has a peak bandwidth wavelength offset from the operating wavelength and the offset is sufficient to substantially reduce intermodal noise at the operating wavelength, and wherein the length of the optical fiber is in the range of approximately 20 m to approximately 100 m, an absolute value of the difference between the operating wavelength and the peak bandwidth wavelength is in the range of approximately 12 nm to approximately 80 nm, and the bandwidth is 1.2 to 7 GHz.km at the operating wavelength.

33. An optical fiber, comprising:

a core; and a cladding, wherein the optical fiber is a multimode fiber at an operating wavelength and has a peak bandwidth wavelength offset from the operating wavelength and the offset is sufficient to substantially reduce intermodal noise at the operating wavelength, and wherein the length of the optical fiber is in the range of approximately 100 to approximately 1000 m, an absolute value of the difference between the operating wavelength and the peak bandwidth wavelength is in the range of approximately 2 to approximately 12 nm, and the bandwidth is 7 to 13 GHz.km at the operating wavelength.

34. An optical fiber, comprising:

a core; and a cladding, wherein the optical fiber is a multimode fiber at an operating wavelength and has a peak bandwidth wavelength offset from the operating wavelength and the offset is sufficient to substantially reduce intermodal noise at the operating wavelength, and wherein the length of the optical fiber is greater than 1000 m, an absolute value of the difference between the operating wavelength and the peak bandwidth wavelength is greater than zero and less than approximately 2 nm, and the bandwidth is greater than 3 GHz.km at the operating wavelength.

35. The optical fiber of claim 34, wherein the bandwidth is greater than 13 GHz.km at the operating wavelength.

* * * * *

UNITED STATES PATENT AND TRADEMARK OFFICE
CERTIFICATE OF CORRECTION

PATENT NO. : 6,798,962 B2
DATED : August 28, 2004
INVENTOR(S) : Berkey et al.

It is certified that error appears in the above-identified patent and that said Letters Patent is hereby corrected as shown below:

Column 13,
Line 43, "the effective area is greater than 70 $\mu m_2$" should be -- the effective area is greater than 70 $\mu m^2$ --

Signed and Sealed this

Seventeenth Day of May, 2005

JON W. DUDAS
*Director of the United States Patent and Trademark Office*